(12) United States Patent
Nixon et al.

(10) Patent No.: US 7,971,151 B2
(45) Date of Patent: Jun. 28, 2011

(54) GRAPHIC DISPLAY CONFIGURATION FRAMEWORK FOR UNIFIED PROCESS CONTROL SYSTEM INTERFACE

(75) Inventors: Mark J. Nixon, Round Rock, TX (US); Stephen G. Hammack, Austin, TX (US); Bruce Campney, Pflugerville, TX (US); Ken J. Beoughter, Round Rock, TX (US); J. Michael Lucas, Leicester (GB); Stephen Gilbert, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 954 days.

(21) Appl. No.: 10/575,173
(22) PCT Filed: May 4, 2005
(86) PCT No.: PCT/US2005/015393
§ 371 (c)(1), (2), (4) Date: Dec. 6, 2006
(87) PCT Pub. No.: WO2005/107409
PCT Pub. Date: Nov. 17, 2005

(65) Prior Publication Data
US 2007/0211079 A1 Sep. 13, 2007

Related U.S. Application Data

(60) Provisional application No. 60/567,980, filed on May 4, 2004.

(51) Int. Cl.
| | |
|---|---|
| G06F 3/048 | (2006.01) |
| G06F 15/177 | (2006.01) |
| G06F 3/00 | (2006.01) |
| G06F 19/00 | (2011.01) |
| G05B 11/01 | (2006.01) |
| G05B 15/00 | (2006.01) |

(52) U.S. Cl. ........ 715/771; 715/735; 715/736; 715/737; 715/761; 700/17; 700/19; 700/83; 700/96
(58) Field of Classification Search .......... 715/733–740, 715/760, 761, 764, 765, 767, 768, 771, 778, 715/781, 788, 799, 800, 802, 803; 700/17, 700/19, 83, 95, 96; 345/619, 649, 650, 660, 661, 672, 676
See application file for complete search history.

(56) References Cited

U.S. PATENT DOCUMENTS 5,168,441 A 12/1992 Onarheim et al.
(Continued)

FOREIGN PATENT DOCUMENTS

EP 0813129 12/1997
(Continued)

OTHER PUBLICATIONS

CAMO product datasheet, "The Unscrambler 9.6," www.camo.com.
(Continued)

Primary Examiner — Crystal J Barnes-Bullock
(74) Attorney, Agent, or Firm — Marshall, Gerstein & Borun LLP

(57) ABSTRACT

A common process control graphical user interface plant operators, plant maintenance personnel, and management is disclosed which provides a real-time interface to both the process and the plant. The common interface is modular in design and is capable of supporting various specializations for each user type. Operator consoles are dedicated to each section of the plant and include additional functions such as maintenance, configuration, simulation and supervisory information. The unified for common graphical interface replaces control room displays filled with single case analog controllers, meters, and digital indicators. The common interface addresses the functions that previously were provided by the panel motor start/stop buttons and status indications, chart recorders, annunciator panels and subsystem interfaces. From a console, operators manage alarms, adjust the process by entering new setpoints or other parameters, "zoom in" on particular portions of the process for details, and utilize other specialized applications to work with their batch, advanced control, or business applications. The interface will run in both dedicated and non-dedicated modes, will run as a rich client or as part of a browser style interface utilizing web services and will run on workstations, laptops, tablet PC's, handhelds, and smart phones.

17 Claims, 10 Drawing Sheets

U.S. PATENT DOCUMENTS

| | | | |
|---|---|---|---|
| 5,611,059 A | 3/1997 | Benton et al. | |
| 5,631,825 A | 5/1997 | van Weele et al. | |
| 5,680,409 A | 10/1997 | Qin et al. | |
| 5,706,455 A | 1/1998 | Benton et al. | |
| 5,841,654 A | 11/1998 | Verissimo et al. | |
| 5,926,177 A | 7/1999 | Hatanaka et al. | |
| 5,980,096 A * | 11/1999 | Thalhammer-Reyero | 1/1 |
| 6,173,208 B1 | 1/2001 | Park et al. | |
| 6,362,839 B1 | 3/2002 | Hamilton et al. | |
| 6,385,496 B1 | 5/2002 | Irwin et al. | |
| 6,396,516 B1 | 5/2002 | Beatty | |
| 6,445,963 B1 | 9/2002 | Blevins et al. | |
| 6,571,133 B1 | 5/2003 | Mandl et al. | |
| 6,587,108 B1 | 7/2003 | Guerlain et al. | |
| 6,618,630 B1 | 9/2003 | Jundt et al. | |
| 6,633,782 B1 | 10/2003 | Schleiss et al. | |
| 6,691,280 B1 | 2/2004 | Dove et al. | |
| 7,110,835 B2 * | 9/2006 | Blevins et al. | 700/83 |
| 7,146,231 B2 * | 12/2006 | Schleiss et al. | 700/83 |
| 7,165,226 B2 * | 1/2007 | Thurner et al. | 715/767 |
| 7,546,602 B2 * | 6/2009 | Hejlsberg et al. | 719/313 |
| 7,555,706 B2 * | 6/2009 | Chapman et al. | 715/234 |
| 7,707,550 B2 * | 4/2010 | Resnick et al. | 717/121 |
| 7,728,838 B2 * | 6/2010 | Forney et al. | 345/474 |
| 7,769,482 B2 * | 8/2010 | Pannese et al. | 700/121 |
| 2002/0019672 A1 | 2/2002 | Paunonen | |
| 2002/0022894 A1 | 2/2002 | Eryurek et al. | |
| 2002/0022895 A1 | 2/2002 | Genise et al. | |
| 2002/0055790 A1 | 5/2002 | Havekost | |
| 2002/0077711 A1 | 6/2002 | Nixon et al. | |
| 2002/0193888 A1 | 12/2002 | Wewalaarachchi et al. | |
| 2003/0014500 A1 | 1/2003 | Schleiss et al. | |
| 2003/0028269 A1 | 2/2003 | Spriggs et al. | |
| 2003/0153988 A1 | 8/2003 | Shepard et al. | |
| 2003/0191803 A1 | 10/2003 | Chinnici et al. | |
| 2003/0236576 A1 | 12/2003 | Resnick et al. | |
| 2004/0075689 A1 | 4/2004 | Schleiss et al. | |
| 2004/0153804 A1 | 8/2004 | Blevins et al. | |
| 2004/0199925 A1 | 10/2004 | Nixon et al. | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |
| 2007/0282480 A1 * | 12/2007 | Pannese et al. | 700/213 |

FOREIGN PATENT DOCUMENTS

| | | |
|---|---|---|
| EP | 1122652 | 8/2001 |
| GB | 2349958 | 11/2000 |
| GB | 2372365 | 8/2002 |
| JP | 2004038596 A | 2/2004 |
| WO | WO 95/04314 | 2/1995 |
| WO | WO 02/071169 | 9/2002 |
| WO | WO 03/075206 | 9/2003 |
| WO | WO 2005/107409 | 11/2005 |
| WO | WO 2005/107410 | 11/2005 |
| WO | WO 2005/107416 | 11/2005 |
| WO | WO 2005/109122 | 11/2005 |
| WO | WO 2005/109123 | 11/2005 |
| WO | WO 2005/109124 | 11/2005 |
| WO | WO 2005/109125 | 11/2005 |
| WO | WO 2005/109126 | 11/2005 |
| WO | WO 2005/109128 | 11/2005 |
| WO | WO 2005/109129 | 11/2005 |
| WO | WO 2005/109130 | 11/2005 |
| WO | WO 2005/109131 | 11/2005 |
| WO | WO 2005/109250 | 11/2005 |

OTHER PUBLICATIONS

Developers.sun.com, "Core J2EE Patterns—Data Access Object," *Core J2EE Pattern Catalog* (2004). Retrieved from the Internet on Feb. 1, 2006: <URL: http://web.archive,org/web/2004041043406/java.sun.com/blueprints/corej2eepatterns/Patterns/DataAccessObjects.html>.

Han et al., "Web Based rSPC (realtime Statistical Process Control) System Supporting XML Protocol," *ISIE*, vol. 1, pp. 399-403 (2001).

Mehta et al., "Feedfoward Neural Networks for Process Identification and Prediction," Neural Network and Experty Systems Presentation (2001).

Mohr et al., "BizTalk and Application Integration—Translating Between Message Specification: BizTalk Mapper," *Professional BizTalk*, pp. 1-3 (2001).

StatSoft product datasheet, "Statistica, Multivariate Statistical Process Control," www.statsoft.com.

Tzovla et al., "Abnormal Condition Management Using Expert Systems," Neural Network and Expert Systems Presentation (2001).

Umetrics product datasheet, "SIMCA-P 11" and "SIMCA-P+ 11," www.umetrics.com.

W3C, "XSL Transformations (XSLT)," *W3C Recommendation*, pp. 3 (1999).

International Search Report for International Application No. PCT/US2005/015393, mailed Sep. 12, 2005.

Notification of First Office Action for Chinese Application No. 200580014272.6, dated Sep. 5, 2008.

Examination Report under Section 18(3) for Application No. GB0620326.9, dated May 1, 2009.

Examination Report under Section 18(3) for Application No. GB0620326.9, dated Dec. 11, 2009.

Office Action for Chinese application No. 200580014272.6 dated Apr. 30, 2010.

Office Action for corresponding Japanese Application No. 2007-511520 dated Feb. 22, 2011.

* cited by examiner

GRAPHIC DISPLAY CONFIGURATION FRAMEWORK FOR UNIFIED PROCESS CONTROL SYSTEM INTERFACE

RELATED APPLICATIONS

This application is a regular filed application of and claims, for the purposes of priority, the benefit of U.S. Provisional Application Ser. No. 60/567,980, entitled "Graphical User .Interface for Representing, Monitoring, and Interacting with Process Control Systems," which was filed on May 4, 2004 and which this application hereby expressly incorporates by reference herein in its entirety. This application is also related to U.S. patent application Ser. No. 10/625,481, entitled "Integration of Graphic Display Elements, Process Modules and Control Modules in Process Plants," which was filed on Jul. 21, 2003, now U.S. Pat. No. 7,110,835, which, in turn, is a Continuation-in-Part of U.S. patent application Ser. No. 10/278,469, entitled "Smart Process Modules and Objects in Process Plants," which was filed on Oct. 22, 2002, now U.S. Pat. No. 7,146,231, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, now U.S. Pat. No. 7,043,311, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: International Application PCT/US2005/015943 (U.S. patent application Ser. No. 10/589,712) entitled "Associated Graphic Displays in a Process Environment"; International Application PCT/US2005/015537 (U.S. patent application Ser. No. 10/574,570) entitled "User Configurable Alarms and Alarm Trending for Process Control Systems"; International Application PCT/US2005/015556 (U.S. patent application Ser. No. 10/590,573) entitled "Integration of Process Modules and Expert Systems in Process Plants"; International Application PCT/US2005/015392 (U.S. patent application Ser. No. 10/574,824) entitled "A Process Plant User Interface System Having Customized Process Graphic Display Layers in an Integrated Environment"; International Application PCT/US2005/015942 (U.S. patent application Ser. No. 10/589,845) entitled "Scripted Graphics in a Process Environment"; International Application PCT/US2005/015588 (U.S. patent application Ser. No. 10/591,804) entitled "Graphics Integration into a Process Configuration and Control Environment"; International Application PCT/US2005/015390 (U.S. patent application Ser. No. 10/590,574) entitled "Graphic Element with Multiple Visualizations in a Process Environment"; International Application PCT/US2005/015391 (U.S. patent application Ser. No. 10/575,022) entitled "System for Configuring Graphic Display Elements and Process Modules in Process Plants"; International Application PCT/US2005/015941 (U.S. patent application Ser. No. 10/590,550) entitled "Markup Language-Based, Dynamic Process Graphics in a Process Plant User Interface"; International Application PCT/US2005/015596 (U.S. patent application Ser. No. 11/556,612) entitled "Methods and Apparatus for Modifying Process Control Data"; International Application PCT/US2005/015585 (U.S. patent application Ser. No. 11/556,445) entitled "Methods and Apparatus for Accessing Process Control Data"; International Application PCT/US2005/015439 (U.S. patent application Ser. No. 11/556,347) entitled "Integrated Graphical Runtime Interface for Process Control Systems"; International Application PCT/US2005/015394 (U.S. patent application Ser. No. 11/556,554) entitled "Service-Oriented Architecture for Process Control Systems".

TECHNICAL FIELD

A common process control user interface for operators, maintenance personnel, management, and others is disclosed. The user interface is capable of supporting specialized graphics for operators, maintenance workers, management, simulator engineers, configuration engineers and others, i.e. all user types, as opposed to separate interfaces for each user type. The common interface exploits fast and accurate translation of raw data into useful animations, trends and patterns which can help in deciding on the actions required to improve the process control. The common interface may be manipulated by the user but includes non-occludable portions such as, for example, alarm notifications.

BACKGROUND OF THE RELATED ART

Process control systems are widely used in factories and/or plants in which products are manufactured or processes are controlled (e.g., chemical manufacturing, power plant control, etc.) Process control systems are also used in the harvesting of natural resources such as, for example, oil and gas drilling and handling processes, etc. Virtually any manufacturing process, resource harvesting process, including agriculture, can be automated through the application of one or more process control systems.

"Distributed" process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, such as the FOUNDATION™ Fieldbus protocol, may also perform control calculations, alarming functions, and other control functions commonly implemented within the controller.

The process controllers receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaVTM control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers.

Typically, these control modules are made up of communicatively interconnected function blocks, which are objects in an object oriented programming protocol that perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality.

The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant.

Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been created as part of or to support the specific applications with which they are associated, and thus are generally limited in usefulness to the specific process function for which they were created. For example, it is difficult, if not impossible, to use a currently available graphical program created to support a control operator in a maintenance, a configuration or a simulation function. Conversely, it is difficult, if not impossible to use currently available graphics programs designed for a maintenance technician to support a control operator, a configuration engineer or in a simulation function. In summary, currently available graphics programs are specialized and not versatile.

As a particular example, some process control configuration applications presently include a library of template objects, such as function block template objects and, in some cases, control module template objects, which are used to create a control strategy for a process plant. The template objects have default properties, settings and methods associated therewith and the engineer using a graphical configuration application can select these template objects and essentially place copies of the selected template objects into a configuration screen to develop a control module.

During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc.

However, these displays are generally preconfigured to display, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. However, the graphical displays used for configuration, operator control, maintenance and simulation activities now need to be created separately from one another using different graphical editors as the separate graphical editors are not translatable between the needs of operators, maintenance personnel, configuration personnel, simulator personnel and management.

Thus, similar to the control configuration application, the display creation application may have template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to users. However, to animate the graphic display, the display creator must manually tie each of the graphical items to data generated within the process plant, such as data measured by sensors or indicative of valve positions, etc. by specifying a communication link between the graphic item and the relevant data source within the process plant. This process is tedious, time consuming, may be fraught with error and must be carried out separately for process control, maintenance simulator, configuration and supervisory personnel.

While the control template objects within the control configuration application and the display items within the display creation application are convenient because they can be copied and used to create many different control modules and graphical displays, there is often a need to create numerous of the same control module and graphical display for different equipment within the process plant. For example, many medium to large sized process plants have numerous instances of the same or similar equipment that can be controlled and viewed using the same basic general control module and display.

To create these numerous control modules and displays, however, a general control module or display module is created and this general control or display module is then copied for each of the different pieces of equipment for which it is applicable. Of course, after being copied, each of the new control or display modules must be manually altered in the configuration application to specify the particular equipment to which it is attached and all of these control and display modules must then be instantiated and downloaded to the process control system.

Unfortunately, the control modules and displays items discussed above are not modular in any manner. Thus, after being copied, each of the control modules and displays must be manually and individually altered using the appropriate configuration application to specify the equipment within the plant to which they are to be associated. In a plant having many copies of the same type of equipment (i.e., replicated equipment), this process is tedious, time consuming and fraught with operator introduced errors. Still further, once programmed, these different control modules and displays are not aware of each other.

Therefore, to make a change to the control modules once created, the engineer or operator must manually make the same change to each of the different control modules for the different replicated equipment which, again, is time consuming and tedious. The same problem applies for the graphical views created for the different sets of replicated equipment within the plant. In other words, once a specific control module or a specific graphical view is created (individually or by being copied from a template object) and is then tied to a particular set of equipment within the plant, this control module or graphical view exists as a separate entity or object within the system without any automatic awareness of the other control modules or graphical displays that are the same or similar to it.

As a result, changes applicable to every one of the control modules and graphical displays of a particular type must be made individually on those modules and displays. This problem is even more evident when graphical views are created for the same equipment but in different functional contexts within the plant, such as for control viewing, maintenance viewing and simulation functions. In this case, the graphical views are created separately without any knowledge or awareness of one another.

Thus, while graphic displays have been provided in and associated with different applications used for different general activities performed within a process plant, these graphic displays and associated graphic display editors were generally added on at the functional level of the application for which they were created to support. As a result, the graphical editors, to the extent they currently exist, have only enabled the user to create graphics that support specific functionality need by a specific application. Previous process plants did not provide a graphical display editor that could be used by or that could support the graphical needs of various or multiple activities being performed in the context of plant configuration and support. Thus, for example, a graphical display editor used to support or enable control configuration activities only enabled the user to create control programs and did not support the needs or functionality of operator or maintenance displays. Similarly, graphic display editors used for creating operator views, maintenance views, etc. to be provided to a control operator or maintenance technician during operation of a plant, did not support functionality associated with configuration activities, simulation activities, etc.

As a result of the graphic display needs being supported at the individual functional levels of the process plant, such as at the control configuration, maintenance support, control operator support and simulation support functional levels, different displays created by these various editors end up modeling and depicting the same components within the plant, which results in the duplication of graphical display efforts by various different personnel with the process plant. This duplication of effort is manifested not only in the effort needed to create the different graphical displays depicting the same process element for different uses, but also in the effort needed to tie the graphical elements used in different display applications to the actual hardware or software elements within the process plant to which they are associated.

Because graphical support for various process plant activities has been provided after the fact, and as part of the actual activity being performed, graphical support is not integrated in the plant environment in a manner that enables common graphics to be created and used within the plant at the various different functional levels of the plant. This non-integration of graphics leads to the graphics actually created for the different functions being different from function to function or from application to application, which can lead to confusion on the part of users who, while familiar with one specific type of graphical display, might occasionally need to view different displays associated with different operations or functions within the plant.

For example, graphical support for operations, maintenance and supervisory functions related to operations and maintenance are typically all different, not integrated, involve different techniques and require training. On the other hand, the provision of graphical display support at the various different functional levels of the plant (e.g. operations, maintenance, management, installation and set-up, etc.) leads to the duplication of various graphic support elements, both in creating displays and properly connecting the elements within the displays to actual hardware or software elements within the plant.

As a result, there is a need for common graphics user interface for process control systems where the various functional levels that support a process or plants, e.g. operations, maintenance, supervisory, etc. are integrated into a single interface platform to eliminate duplication involved in employing non-integrated programs and to better assist all process control personnel in becoming familiar with the interfaces used by their coworkers. Such a common or universal graphics interface should be easily modified and manipulated by the end users while making some displays, such as alarms or other imperative displays, non-occludable.

SUMMARY OF THE DISCLOSURE

A graphical interface for operators, maintenance personnel, management, and others of various functions in a process plant environment is disclosed that provides a real-time interface to both the process and the plant. The interface is capable of supporting various specializations and functions for each user type. The users are relatively free to manipulate their workstations with multiple floating panel displays through the use of a configuration database. The configuration database binds data sources and events to low level shapes.

In an embodiment, the configuration databases of the interface provides downloadable displays that allow operators to follow the process being controlled by taking advantage of the fast and accurate translation of raw data into useful animations, trends and patterns which can help in deciding on the actions required on the part of the operator. However, the same interface also provides appropriate displays for a maintenance person regarding the process being controlled by the operator and provides various types of reporting data for use by management personnel. Simulation and configuration displays are also available from the configuration database. All of these functions are supported by a single interface platform.

In an embodiment, the interface graphics of an operator console is extended to include additional functions such as maintenance and supervisory reports. The interface can be used an operator station, which may include one or more monitors, a standard or custom keyboard, a sound card, speakers, and a pointing device such as a mouse, trackball, and/or touch screen. The disclosed operator graphics interface replaces the control room panel board filled with single case analog controllers, meters, gauges and digital indicators.

In an embodiment, the disclosed interface includes one or more of the following functions: panel motor start/stop buttons, status indications, chart recorders, annunciator panels and subsystem interfaces.

In an embodiment, the disclosed user interface enables operators to perform one or more of the following: manage alarms, adjust the process by entering new setpoints or other parameters, "zoom in" on particular portions of the process for further details, and utilize other specialized applications related to the process being performed and controlled.

In an embodiment, the disclosed graphical interface can run in both dedicated and non-dedicated modes.

In an embodiment, the disclosed graphical interface can run as a rich client or as part of a browser style interface utilizing web services.

In an embodiment, the disclosed graphical interface can run on workstations, laptops, tablet PC's, handhelds, and smart phones.

In an embodiment, the disclosed interface supports a dedicated mode for use in control rooms or any place where the display arrangement needs to be fixed and/or access strictly controlled (i.e. kiosk style application environment).

In an embodiment, the configuration capabilities of the disclosed graphical interface supports a non-dedicated mode for use by configuration personnel, engineers, plant management, and others where flexibility and the richness of the interface are dominant features.

In an embodiment, the configuration capabilities of the disclosed graphical interface supports multiple user interface devices including, but not limited to rich clients, web browsers, handhelds, and smart phones.

In an embodiment, the disclosed graphical interface supports one or more of the following features: integrated voice and video; input techniques such as those used in tablet PCs; real-time data services including embedded historian data, alarms, events, etc.; external data services; XAML files; access to other service interfaces; process graphics including composite structures; class-based control hierarchies; integration of control, alarming, and abnormal situation management and prevention; integrated batch operator interfaces; integrated advanced control operator interfaces; route management; efficiency calculations; optimizations; mass and energy balances; integration of third party applications; decoupling of applications from the DeltaV® core subsystems; support for multiple data collection systems (DCS); support real-time data from multiple systems, e.g. DeltaV® and PRQVOX®; support alarming from multiple systems, e.g. DeltaV® and PROVOX®; support areas on the display that cannot be occluded such as alarm banners.

In an embodiment, the disclosed graphical interface allows displays and other applications to be loaded into a runtime workspace. The runtime workspace provides a safe environment where the various applications can execute. The runtime workspace can be customized for each target environment including but not limited to smart phones, handhelds, tablets, laptops, workstations, and multi-panel workstations.

In an embodiment, the disclosed graphical interface provides an ability to build a completely integrated display system.

In an embodiment, the disclosed graphical interface provides global track binding to data values and events.

In an embodiment, the disclosed graphical interface provides an ability track to where displays are used in the system.

In an embodiment, the disclosed graphical interface provides a complete version tracking on the display(s).

In an embodiment, the disclosed graphical interface provides an ability to link data from other sources.

In an embodiment, the disclosed graphical interface provides an ability to use data from other sources.

In an embodiment, the disclosed graphical interface provides an ability to define libraries of reusable displays and display components.

In an embodiment, the disclosed graphical interface provides an ability to define plant standards, lock said standards, version said standards and easily share said standards amongst multiple users of different function levels.

In an embodiment, the disclosed graphical interface provides a means for developing safe views for plant personnel to use on their wide variety of devices.

In an embodiment, the disclosed graphical interface provides fully scalable graphics with special features for rotation, transparency, etc for accessible to multiple users of different function levels.

Other features and advantages will be apparent to those skilled in the art from the following detailed description with reference to the accompanying drawings and appended claims.

BRIEF DESCRIPTION OF THE DRAWINGS

Various features of the disclosed unified graphical display configurations are illustrated in the accompanying drawings, wherein.

It should be understood that the Figures are not to scale and that the disclosed embodiments are illustrated using graphic symbols, diagrammatic representations and fragmentary views. Details may have been omitted which are unnecessary for understanding of the disclosed embodiments or which render other details difficult to perceive. It should be understood, of course, that this disclosure is not limited to the particular embodiments illustrated herein.

DETAILED DESCRIPTION OF THE PRESENTLY PREFERRED EMBODIMENTS

Figure 1:
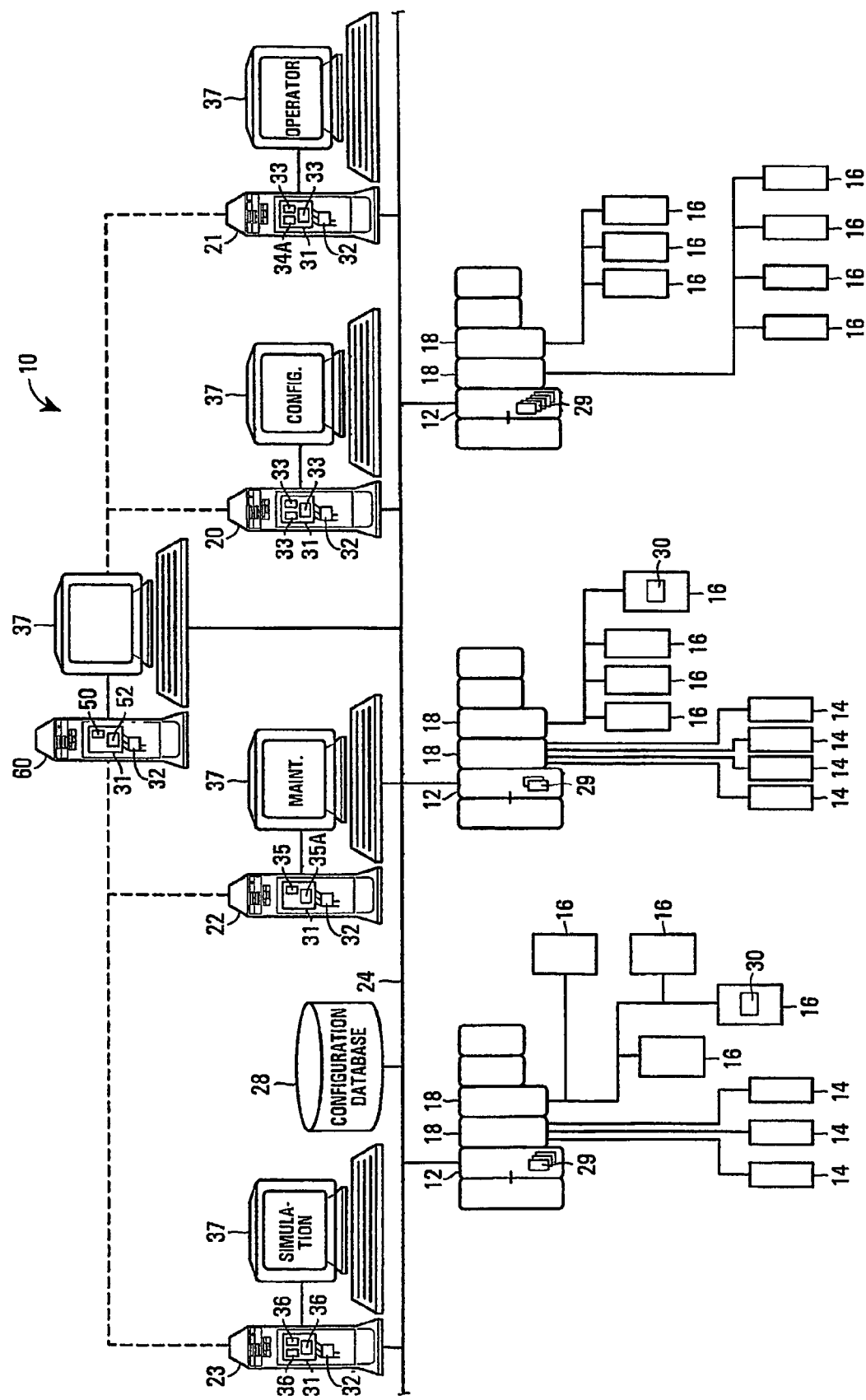
FIG. 1 is a block diagram of a distributed process control network located within a process plant including operator workstations that implement display routines and other applications associated with various functions within the process plant, as well as a workstation that provides system level graphical support that may be used to create display elements and displays for each of the various functional areas of the plant.

FIG. 1 illustrates an example process plant 10 in which system level graphical support is provided to various functional areas of the plant 10. As is typical, the process plant 10 includes a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 24 which may be, for example, an Ethernet link.

A database 28 may be connected to the data highway 24 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects created in the manner described herein to provide graphical support within the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller or maintenance personnel.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10.

As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, maybe executed in conjunction with the execution of the control modules 29 within the controllers 12 to implement process control, as is well known. Of course, the field devices 14 and 16 maybe any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface creation applications and other data structures which can be accessed by any authorized configuration engineer to create and download control routines or modules, such as the control modules 29 and 30, to the various controllers 12 and devices 16 of the plant 10.

The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34*a* such as control diagnostic applications, tuning applications, report generation applications or any other control support applications that may be used to assist a control operator in performing control functions.

Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35*a* such as maintenance diagnostic applications, calibration applications, vibration analysis applications, report generation applications or any other maintenance support applications that may be used to assist a maintenance person in performing maintenance functions within the plant 10.

Additionally, the workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. As is typical, each of the workstations 20-23 includes a display screen 37 along with other standard peripheral devices, like a keyboard, a mouse, etc.

Of course, while the various configuration, control, maintenance and simulation applications 33-36 are illustrated in FIG. 1 as being located in different workstations dedicated to one of those functions, it will be understood that the various applications 33-36 associated with these or other plant functions may be located in and executed in different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

In the past, the development of the different applications used in the different functional areas of the plant 10 was performed fairly independently. Thus, the development of the configuration applications 33 was not integrated with the simulation applications 36, the maintenance applications 35 or the operator control applications 34. In fact, in many instances, a plant may have included applications for the different functional areas that were developed by different companies or software suppliers, and which were in fact developed to run independently of the other software within the plant 10.

As a result of this independent development and operation of the different applications associated with the various functional areas of the plant 10, plant personnel were generally required to configure or set up a plant separately at each of the configuration, operator control, maintenance and simulation functional levels. In particular, the same or different plant personnel generally had to use different programs to establish new data structures and graphical displays at each of the functional levels. Thus, with respect to FIG. 1, each of the various applications 33-36 the performed configuration, control, maintenance and simulation functions generally included or used different graphic display editors and database structures to assist the plant personnel in performing these configuration, operator control, maintenance and simulation functions.

In many instances, these different graphic display editors and databases were used to create different graphical displays to depict or model the same sections or areas of the plant 10 or the same hardware within the plant 10, and to assist different plant personnel to visualize and understand what is happening within the process plant in the context of configuration, operator control, maintenance or simulation activities.

Because the applications 33-36 and the associated displays for each of the various functions within the plant 10 were generally developed and implemented independently of one another, sometimes by different people and even different companies, the graphical displays created or used in the different functional areas of the process plant were not integrated in any consistent or easily understood manner from the standpoint of providing graphical visualization. As a result, the independent creation and execution of graphical displays at the various different functional levels of the plant led to the graphical displays looking different from function to function, so that there was not consistent look and feel to the graphic displays across the functional areas.

Additionally, this independent creation led to the duplication of effort in creating graphical displays for the same sections or areas of the plant but for different functional uses, and required that the graphical displays so created be tied into and receive data from the various devices within plant 10, such as the controllers 12 and the field devices 14, 16, separately at the functional levels of the plant 10. This fact, in turn, required the duplication of database structures to track the same hardware elements for the different displays. Thus, for example, in the past, a first application (e.g., one of the applications 35) was used to create a maintenance display that illustrates a section of the plant 10 for maintenance purposes while a second application (e.g., one of the applications 34) was used to create a control operator display that illustrates the same section of the plant 10 for control purposes.

The displays created separately by these different display editors could be quite different in look and feel, making it difficult for a user to switch back and forth between the maintenance display and the operator display without becoming easily confused or without requiring training on each type of display. Likewise, effort was duplicated in creating both displays independently in the different applications 34 and 35, and additional effort was expanded to create database structures to separately tie or connect the maintenance display and the control operator display to the same hardware elements within the plant 10 to receive sometimes the same or similar data from those hardware elements.

To alleviate these inefficiencies and to provide for more widely usable and understandable graphics within the plant 10, a graphical support layer is provided at a system level of the process plant 10 to support the graphical display and data structure needs of each of the various functional areas of the plant, including the configuration, operator viewing, maintenance viewing, simulation and other functional areas of the plant 10.

Figure 2:
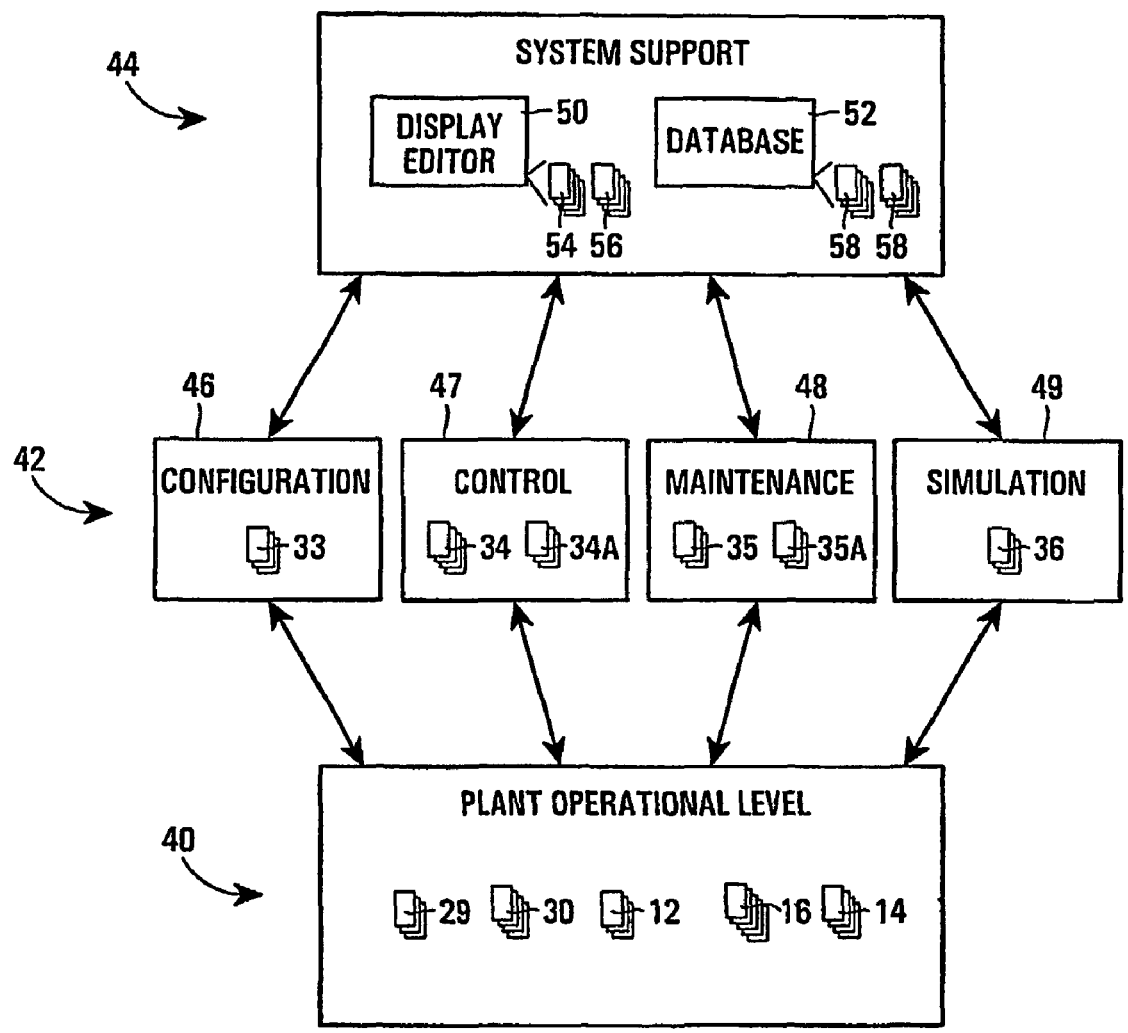
FIG. 2 is a logical block diagram illustrating the integration of system level graphical support within a process plant control, viewing and simulation system.

This system level of support is depicted diagrammatically in FIG. 2, which illustrates a plant operational level 40, a plant functional level 42 and a system level 44. As will be understood from FIG. 2, the plant operational level 40 includes the controllers 12, field devices 14, 16, etc. which execute the control routines or modules 29 and 30, as well as other software run within the plant 10 to implement plant operations on a day-to-day basis. The plant functional level 42 is depicted as including a configuration function block 46, a control function block 47, a maintenance function block 48 and a simulation block 49, although other or different functions could be provided as well.

The configuration function block 46 implements the configuration routines 33 which interface or communicate with components within the plant operational level 40 to provide control strategies or control modules thereto. The control function block 47 includes the control viewing and other applications 34 and 34a which also interface or communicate typically directly with the various physical and logical components within the plant operational level 40 to implement operator initiated changes within the plant, to provide information to the operator via control displays 34, to acquire data for the control applications 34a, etc. The maintenance function block 48 includes the maintenance routines and applications 35 and 35a which interface or communicate with various physical and logical components within the plant operational level 40 to implement maintenance procedures, to collect maintenance data, to provide maintenance data or information to a maintenance person via maintenance displays 35, to run diagnostic applications 35a, etc. Likewise, the simulation function block 49 includes simulation routines 36 which implement simulations of the plant 10 and which may be communicatively coupled to components within the plant operational level 40 to obtain data regarding the plant.

As illustrated in FIG. 2, the system level support layer 44 ties into and supports each of the function blocks 46-49 within the plant functional layer 42 to enable, for example, the creation and maintaining of common database and display structures, such as software objects, graphical elements and graphical displays for use in the various functional areas 46-49. More particularly, the system level support layer 44 includes application, database and graphical support elements that enable the graphical activities performed in each of the function blocks 46-49 to be integrated together, or to be developed using common database structures and graphical elements created at the system support layer 44.

To provide this system level support, the system support layer 42 may include a graphical display editor 50 and a graphical object database 52. The graphical editor 50 creates graphical elements 54 and graphical displays 56, while the graphic object database 52 stores the elements 54 and displays 56 in a memory accessible by the editor 52 and by the various applications in the blocks 46-49. The database 52 may also store other objects 58 and data structures that connect the graphical elements 54 to individual hardware and software elements within the plant operational level 40. Additionally, the database 52 may store graphical element or display templates or primitives that may be used to create further graphical elements or displays. As will be understood from FIG. 2, the graphical display elements 54, displays 56 and other database structures 58 may be used by in any and all of the functional blocks 46-49 to create and use graphics associated with those functional blocks.

As will be understood, the system level support block 44 provides a manner of integrating the graphics used in the process plant 10 of FIG. 1 in all of the functional areas, to thereby reduce or eliminate the necessity of repeatedly creating different graphical elements for the same plant equipment in different functional contexts, and to make it easy for a user in each of the functional areas 46-49 to tie into data associated with the equipment being displayed in graphical views associated with those functional areas. As will be understood, the system level support layer 44 may be used to provide graphics and database support for multiple applications in each of the functional areas 46-49, for different applications in different ones of the functional areas 46-49, etc.

Referring again to FIG. 1, the system level support block 44 may be implemented using an additional workstation or user interface 60 which may be connected to each of the other workstations 20-23. The workstation 60 may generally store the graphics editor 50 and database 52 and may store the other elements 54, 56 and 58 if so desired. Additionally, the workstation 60 maybe communicatively connected to the workstations 20-23 via the databus 24, via separate wired or wireless communication connections (illustrated by dotted lines in FIG. 1) or in any other desired manner.

In the configuration illustrated in FIG. 1, the workstation 60 stores and executes the display editor 50 to enable a user to create graphical elements and to group such elements into one or more graphical displays, both of which are referred to herein as display modules. These display modules may be then stored in the database 52 to be accessed and used by various ones of the functional blocks 46-49 illustrated in FIG. 2 and implemented on the various workstations 20-23. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the graphics editor 50 may be stored in and executed on any of the other workstations 20-23 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as graphical elements and graphical displays. Graphical elements are generally primitive or low level display objects that are associated with a particular physical entity within the plant, such as a hardware device like a valve, a sensor, a pump, a controller, etc. Graphical displays are generally made up of a set of interconnected display elements and are used to represent and model more complicated sets of hardware within a plant, such as a unit, an area, etc. and includes interconnections between different hardware units. Additionally, graphical displays may include graphs, charts and other data provided from the plant, from other applications, such as diagnostic and business applications running in the workstations 20-23 and 60, etc.

Figure 3:
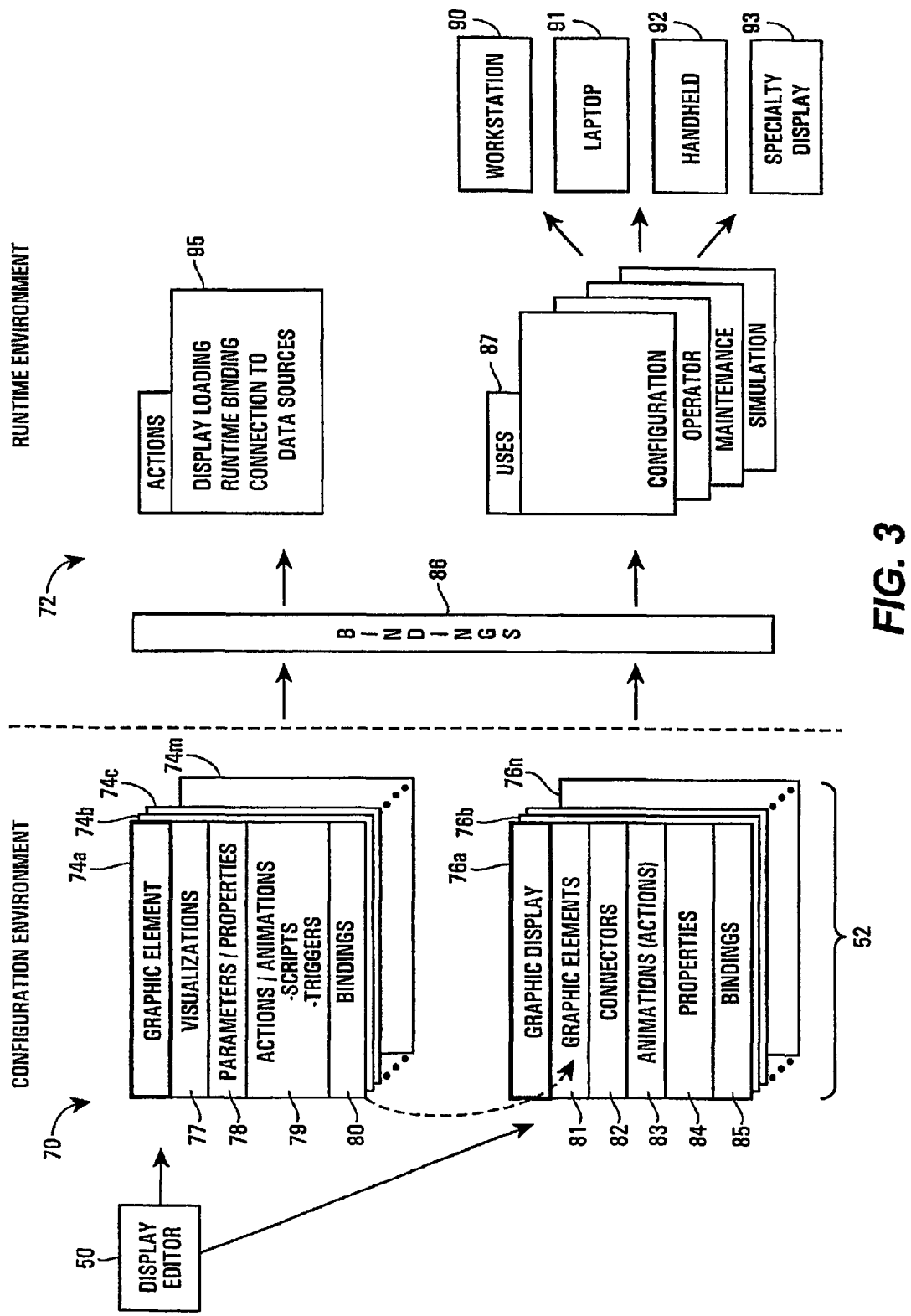
FIG. 3 is a logical diagram illustrating a configuration environment in which graphical elements and displays are created and a runtime environment in which graphical elements and displays may be executed.

FIG. 3 generally illustrates the development and use of graphical elements and graphical displays in two environments in which these elements and displays may exist, in particular, a configuration environment 70 and a runtime environment 72. Generally speaking, display objects in the form of graphical elements 74 (depicted as separate element objects 74a, 74b, etc.) and graphical displays 76 (depicted as separate display objects 76a, 76b, etc.) are created in the configuration environment 70 using, for example, the display editor 50. After being created, the objects 74 and 76 may be stored in the database 52.

The objects 74 and 76 may be created as class objects, referred to herein as display module class objects, which define a generic object not bound or tied to specific hardware or logical elements within the process plant. However, class objects can be used to create runtime graphical objects having the same basic properties as the class objects, but which are tied or bound to specific hardware within the process plant. Generally speaking, however, class objects remain tied to the children objects instantiated therefrom, so that changes to the class objects can be automatically propagated to the children objects, even when these children objects are instantiated within a runtime environment.

As illustrated in FIG. 3, each of the graphic element objects 74 includes a number of components that make the graphical element useful in many different contexts. In particular, each graphical element 74 includes one or more visualizations 77, any number of parameters or properties 78, any number of actions or animations 79 which may be implemented as scripts or triggers, and bindings 80. Generally speaking, each visualization 77 defines the visual properties or elements to be actually displayed on a display screen when the graphic element is implemented in the runtime environment 72.

Typically, visualizations define a representation of a physical or logical device or group of devices, although a visualization could represent other entities. Visualization 77 may be implemented in the runtime environment 72 using any desired description or programming paradigm that defines the specifics of the graphical depiction of an entity. In one embodiment, the visualizations 77 may be implemented using PGXML or Avalon controls, which are well known controls provided by Microsoft® and which, because they are object based, provide a manner of making the visualizations easily implementable in standard Windows type displays and portable between display environments.

Generally speaking, the parameters and properties 78 define variables or other properties such as static or changeable intrinsic properties, associated with the entity being depicted by the visualization. Likewise, the actions and animations 79 define programs (which may be implemented as scripts), routines or behaviors to be performed on or using the visualization 77 when the visualization 77 is depicted on a display screen, to provide the visualization with more interesting, understandable or helpful graphical properties. In one case, these actions or animations may take the form of changes in color, size (e.g., height and width, line size, fonts, etc.) of various components of the visualization, color fills, and animations such as changes in color, rotations, changes in size and scaling, skewing, etc.

These actions and animations provide graphical properties as well as user interaction properties to the graphical element 74. The bindings 80, which may be static or fixed bindings or bindings which use aliases, define the manner in which the parameters or properties 78 are to be bound to data, tags or other entities within the runtime environment 72 when the graphic element 74 is implemented as part of a display in the runtime environment 72. Basically, the bindings 80 for each graphical element 74 establish the manner in which the graphical element 74 is tied to one or more entities or data elements defined elsewhere in the plant environment and thus defines an interface between the actual runtime environment 72 and the graphical element 74.

As illustrated in FIG. 3, each of the graphic display objects 76 includes numerous components, such as a reference to one or more graphic elements 81, connector elements 82, actions and animations 83, properties 84 and bindings 85. Generally speaking, a graphic display 76 may be a display that depicts the interaction of various graphic elements 81 which may be visually connected together with connector elements 82 representing pipes, lines, conveyor belts, etc. A dotted line in FIG. 3 illustrates a reference to one of the graphic elements 74 by the graphic display 76a. It will be understood that the graphic display that references a graphic element includes all of the properties, parameters, actions and animations, etc. of that graphic element.

Similar to the graphical elements 74, each graphical display 76 may include one or more actions or animations associated therewith that perform, for example, animations on the display, user interface interactions, data manipulations, etc. Likewise, each graphical display 76 may include any number of properties associated with the display, and typically these properties define properties of units, areas, or other groups of elements depicted within the display. Of course, the bindings 85 define the manner in which the graphical display 76 is tied to one or more entities or data elements defined elsewhere in the plant environment and thus defines an interface between the actual runtime environment 72 and the graphical display 76.

Once created, the graphic displays 76 and the graphic elements 74 may be bound to and executed in the runtime environment 72 on, for example, any of the workstations 20-23 of FIG. 1. In particular, after a graphic element 74 or a graphic display 76 is created as a class object and is stored in the database 52, that element or display may be instantiated as an actual runtime object and may be executed in the runtime environment 72.

As illustrated by the block 86, the instantiation process fills in the bindings defined in the objects 74 and 76 in a resolution table that may be loaded with proper variable names, tags, aliases etc. within the process plant or process control system to provide a specific connection between actual entities within the process plant and the display objects or display modules running on a display device within the plant. As part of the binding process, the display objects 74 and 76 thereby connect to data sources within the process plant as defined by the resolution table to thereby gain access to the plant and to logically and communicatively connect the instantiated display object to the process plant 10.

As illustrated by the blocks 87, a display element 74 or a graphic display 76 can be executed in or as part of a number of different functions within the runtime environment 72, including a configuration display, a control operator display, a maintenance display and a simulation display, to name but a few. Additionally, the display objects 74 and 76 may be used in performing system level functions, e.g., ones that use data from various ones of the functional levels depicted in FIG. 2, including for example, predictive control or predictive maintenance functions, system level error detection, etc. In fact, the displays, once created in the configuration environment 70 and stored in the database 52 may be used for a number of different activities.

Still further, the display objects 74 and 76 may be executed on any desired display or computer hardware, such as a workstation 90, a laptop computer 91, a handheld device 92, like a personal data assistant (PDA), a telephone device, etc., or any other specialty display 93, such as a large screen display having multiple monitors, etc. If desired, a single graphic display 76 may be layered to include one or more views, such as configuration view, an operator view, a maintenance view and a simulation view. Alternatively, separate graphical displays 76 may be configured to provide these separate views using the same or similar graphical elements 81, to provide a consistent look and feel across displays created for these various functions.

As illustrated by the block 95, to be ported to the runtime environment 72, a graphical element 74 or a graphical display 76 may be copied or instantiated, and loaded onto the runtime machine. Generally speaking, it is desirable that the display object 74 or 76 be bound to the runtime environment 72 only when called up or actually executed on a runtime machine, which is referred to herein as runtime binding. That is, the resolution table for each of the instantiated objects is only filled in or bound to the runtime environment when the display object is actually running or being executed in a runtime computer. This procedure assures that the display object including its visualizations, controls, scripts, etc. only executes and thereby uses processing power when the visualization(s) of the object are actually being rendered on a display screen.

In other words, the display object is preferably only bound to the runtime environment 72 when that object is actually running on a runtime computer. Thus, the display objects 74 and 76 may be intermittently connected to the runtime environment 72 in a manner defined by the activities of the users viewing the visualizations created by these objects. In particular, these objects may be bound to a runtime environment 72 at the times at which they are required to be viewed, and may be unbound or released when not being viewed by a user, such as when a user minimizes or closes a screen in which these objects are providing a visualization.

The display objects 74 and 76 are thus simply objects which may be created in a stand-alone environment, i.e., the configuration environment 70, but which may be tied or connected with other objects or data structures defined within the process plant or any application running within the process plant environment, including, for example, objects or data structures defined in any control, simulation, maintenance, or configuration environment. Furthermore, once created, the display objects 74 and 76 may be definitely bound to these physical or logical process entities directly, via direct references, variables or tags defined a resolution table, or indirectly through the use of alias names, variables and parameters, which may be resolved either when the display object 74 or 76 is downloaded or instantiated within the a runtime environment 72, or in some cases, when the display object 74 or 76 is actually running within the runtime environment 72.

The display editor 50 may enable the display objects 74 and 76 to be created at various levels of detail, to enhance the ease of use and the versatility of the display objects 74 and 76. For example, graphical elements 74 may be created first to define the properties and operations of more primitive physical and logical entities, and graphical displays 76 may then be created by interconnecting one or more graphical elements 74 to create higher level or more complicated displays depicting more complicated physical or logical entities, or groups of physical or logical entities.

Figure 4:
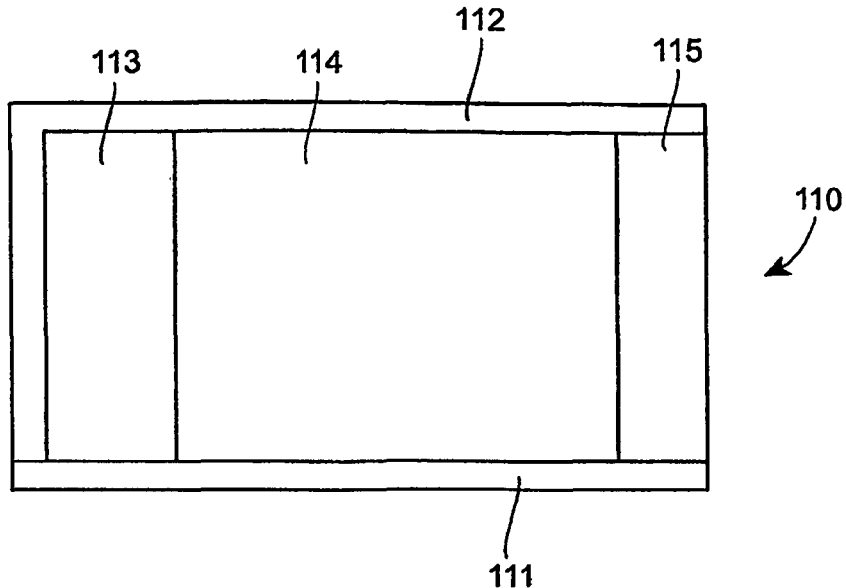
FIG. 4 is a example of a run time graphical interface workspace capable of being customized for various target environments including workstations, multiple panel workstations, phones, handheld devices, tablets and laptops.

FIG. 4 is an example of a display 110 that includes a lower alarm banner 111 which is not occludable. The display 110 also includes a configuration banner 112 that may extend along the vertical edge of the display 110 as well. The positions of the alarm banner 111 and configuration banner 112 are clearly interchangeable and can be disposed on other parts or aspects of the display 110. The display 110, as shown, includes three main display sections including a notification section 113, a main section 114 and an additional section 115 which may include loadable faceplates, trends and other viewing options. The notification section 113 is used primarily for notifications applicable to operators, maintenance people and supervisory personnel. The main display 114 may include a graphic display of an equipment module or the overall system (e.g., see FIG. 3 below) or may include data in numerical, verbal or graphical form. It is important that the alarm banner 111 not be occludable as process control alarms and their notifications would be important to all personnel, in addition to operator personnel. In an embodiment, the alarm banner is not scalable or moveable. However, movement of the alarm banner 111 may be useful to non-operating personnel who are less concerned with alarm banners than managers, maintenance and configuration engineers.

The configuration function 112 of the display 110 enables a user to configure the display 110 as an operation control display, as a maintenance display, as a configuration display, as a simulation display or as a display intended for management personnel or, a combination of any one or more of these as discussed below. Further, the displays disclosed herein may be shown on a one monitor workstation, a multiple monitor workstation, a PDA device, a phone or a tablet PC type of device.

Figure 5:
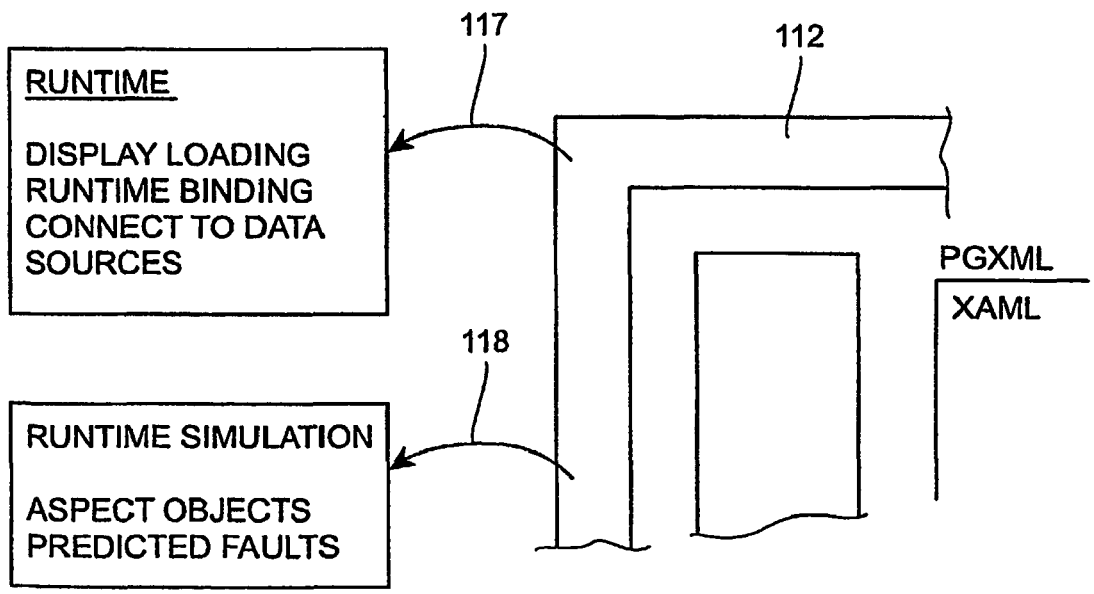
FIG. 5 is a partial view of the graphic interface shown in FIG. 1 schematically illustrating steps for creating low level shapes and shape composites, binding data sources and events to the data sources, creating complete displays, storing displays in a configuration database, downloading displays from the configuration database and generating a run time loadable view of the configuration database suitable for loading into a rich user interface or web browser.

The configuration of a display 110 in accordance with this disclosure includes the creation of low level shapes and shape composites 77-80 (see FIG. 3), the binding of data sources and events to those data sources as shown at 86 in FIG. 3, the creating of complete displays 110, the storing of displays 81-85 in a configuration database, the downloading of displays from the configuration database and the generation of run time loadable views of the configuration database for loading into a rich user interface or a web browser. An example of this is illustrated in FIG. 5 whereby run time functions are accessible from the configuration banner 112 and include display loading, run time loading, and binding or connection to data sources. Also accessible from the configuration banner 112 or run time simulation, as backed objects and predicated faults. The arrows 117, 118 are intended to represent the downloading of various scripts from the configuration database, which is accessible from the configuration banner 112.

Figure 6:
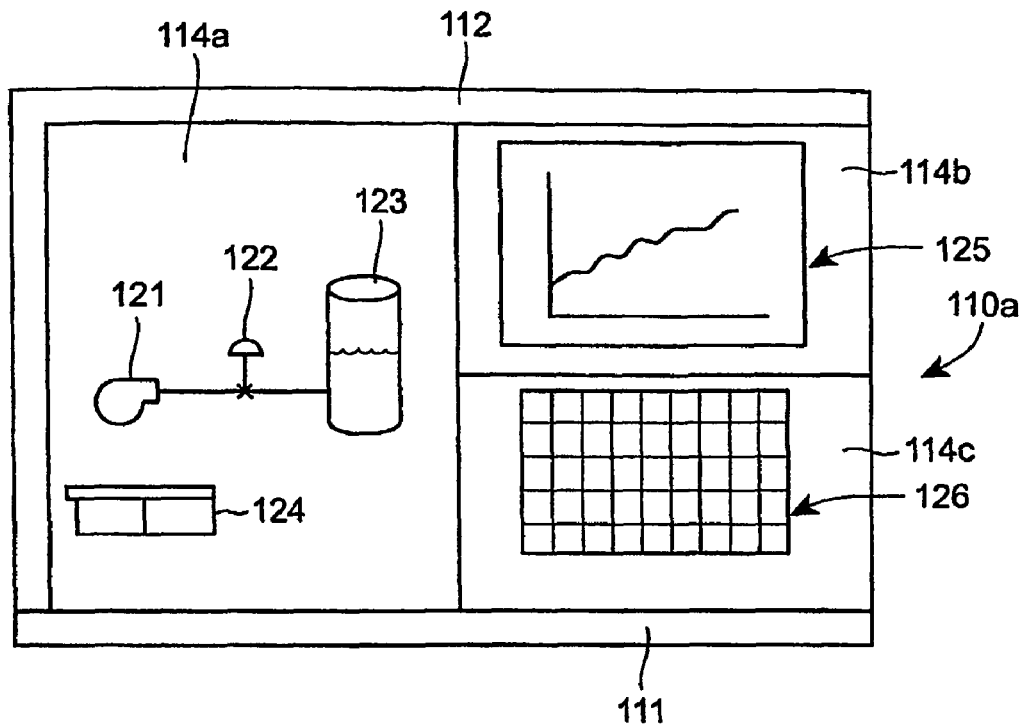
FIG. 6 is a schematic illustration of a graphic interface that supports multiple data sources including a schematic of a process control module, a graphical illustration of a data trend and a spreadsheet or grid data presentation.

Turning to FIG. 6, a modified display 110a is shown, with the non-occludable alarm banner 111 in primary or main displays 114a, 114b and 114c. In 114a, the schematic illustration of part of an equipment module is shown including a pump 121, control valve 122 and accumulation tank 123. As the tank is being filled, a data table 124 indicates the way to fill the tank 123. However, additional information may be necessary and, accordingly, the display 114b includes a graphical presentation 125 of the filling of the tank 123 and the display 114c includes either a spreadsheet or grid 126 showing the ongoing data accumulation in numerical form. In this way, the displays may be arranged in increasing levels of detail starting from overview displays working down to detailed displays which focus on a single aspect of the system. These and other displays may be easily configured using the disclosed interface and other variations will be apparent to those skilled in the art, some examples of which are discussed below.

Figure 7:
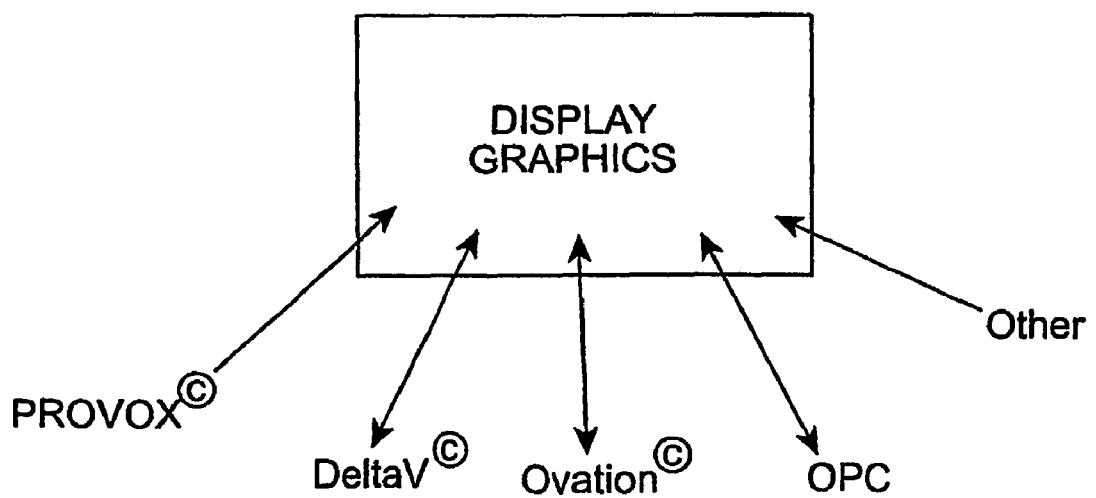
FIG. 7 is a schematic illustration of the disclosed graphical interface supporting data from multiple data sources.

Turning to FIG. 7, the display graphic software of this disclosure is interchangeable with other data sources and programs including the assignees own DeltaV® Software, OVATION® Software, PROVOX® Software, and Open Process Control (OPC) Software. The graphic display interface disclosed herein is also able to communicate with competing databases and software as shown in FIG. 7.

Figure 8:
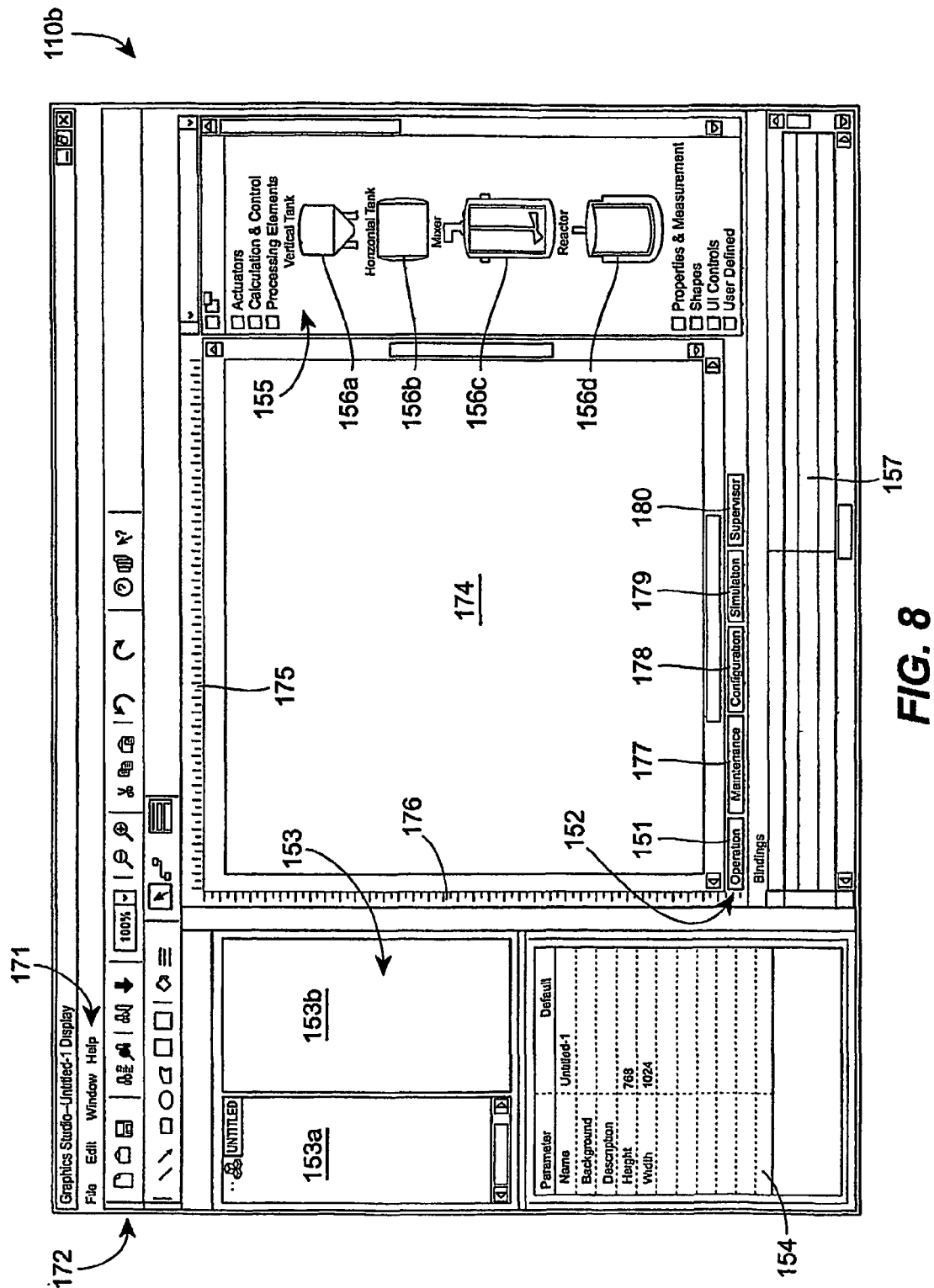
FIG. 8 is a schematic illustration of a graphics editor workspace designed in accordance with this disclosure.

FIG. 8 is an example of a graphics display 110b under design for an operator is indicated by the button 151 that has been activated in the lower tool bar 152. The graphics hierarchy view 153 is intended to display the graphic object hierarchy for the display 110b. The property view 154 initially displays document property and then changes to display properties for newly chosen tools or currently selected objects as the display 110b is being designed. A pallet view 155 displays multiple pallets of process elements 156a-156d. A list of external references used in the display 110b can be found in the bindings view shown at 157. For every display or element a user creates or modifies, a separate document window will be opened with the name of the file appearing in the title bar.

The display editor shown in FIG. 8 also includes the following features. The menu 171 includes all of the user commands that can be applied to a particular graphic element. The tool bar 172 includes shortcuts to various menu commands. The graphics hierarchy 153 includes two elements including a tree view 153*a* and a list view 153*b*. The properties view lists the intrinsic properties and events of a particular graphic element. The main screen 174 is the main editing area. The pallet 155 lists the various graphic elements 156*a*-156*d* that are defined in the system. The interface shown in FIG. 8 also includes a horizontal ruler 175 and a vertical ruler 176. The embodiment illustrated in FIG. 8 can support five layers including an operation layer 151, a maintenance layer 177, a configuration layer 178, a simulation layer 179 and supervisory or management layer 180. More or less of all of these layers are functions can be utilized. In addition, a training layer may also be utilized.

Figure 9:
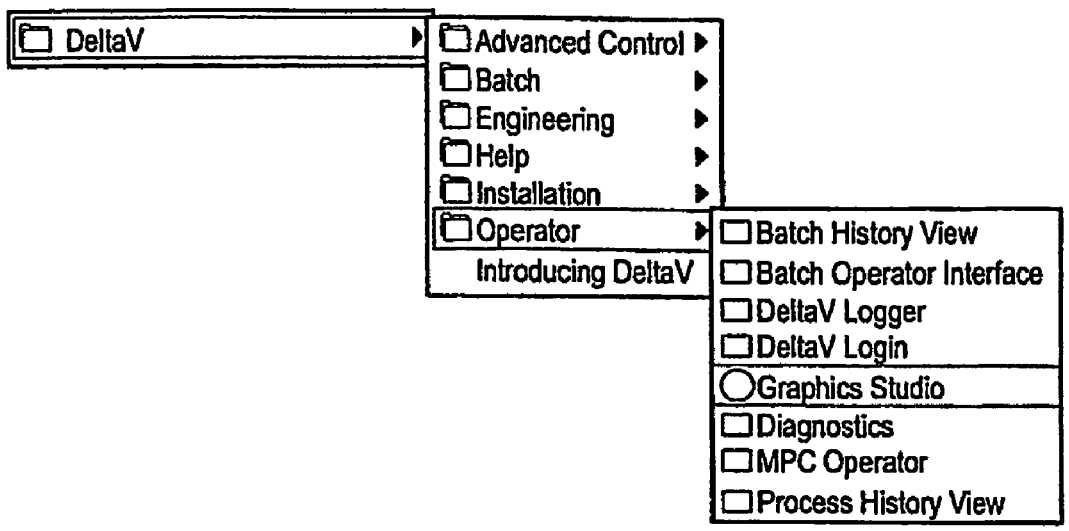
FIG. 9 illustrates a workspace view of one means for launching the editor program illustrated in FIG. 8.
Figure 10:
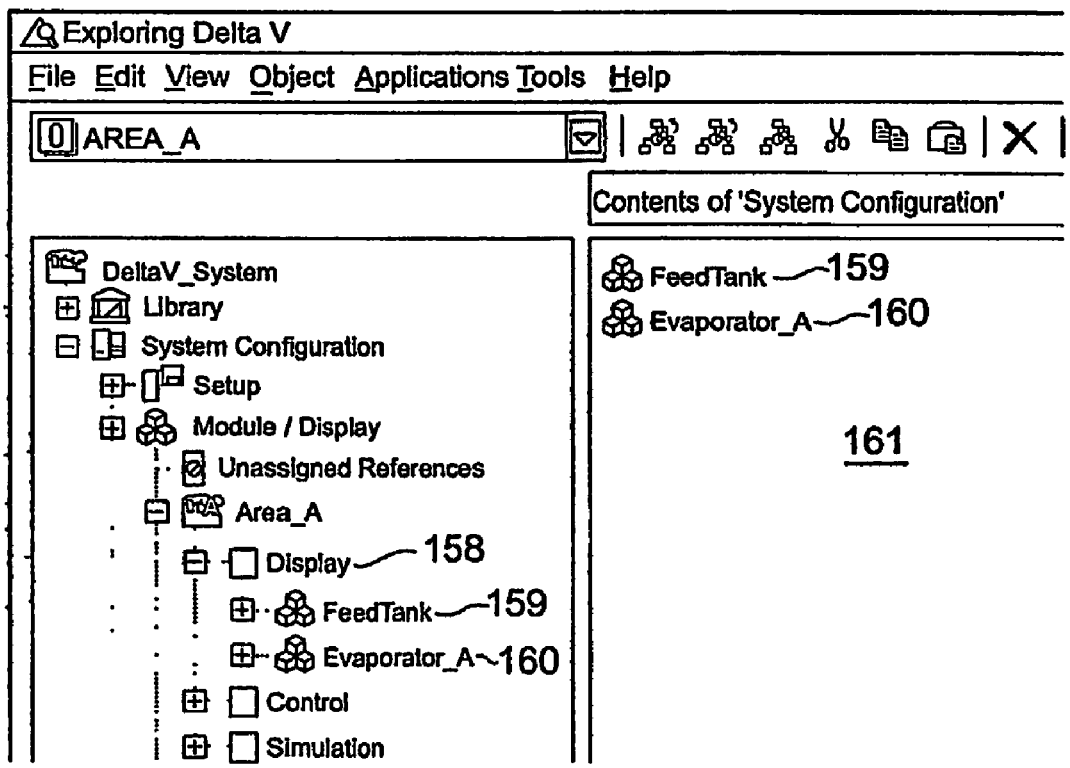
FIG. 10 illustrates an explore function of the editor described in FIG. 9.

FIG. 9 is an example of one means for launching the graphics program shown in FIG. 8. FIG. 10 is a partial view of a screen showing various displays that have been created and stored in various files of the database. When a "display" 158 is selected, the files 159, 160 will then appear in the main screen 161 as shown in FIG. 10.

Figure 11:
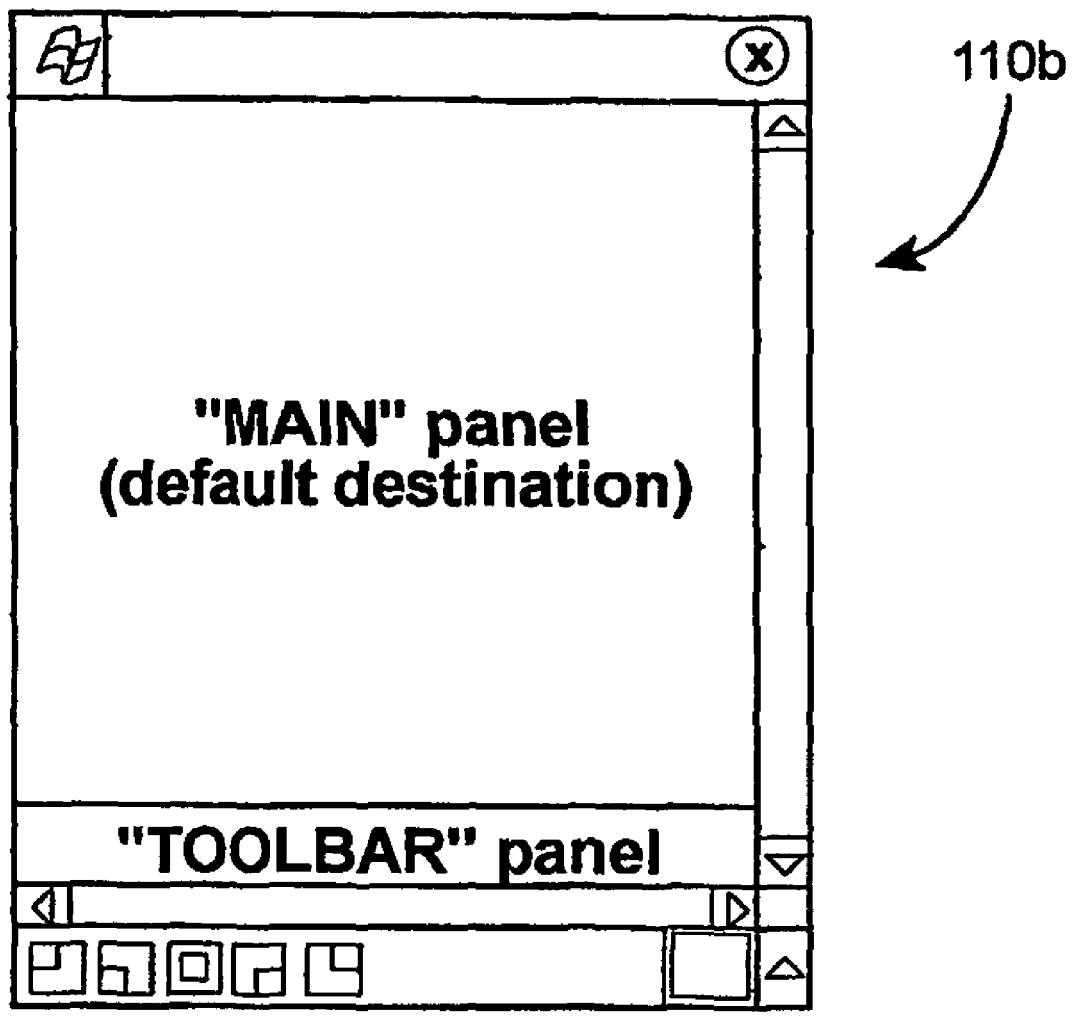
FIG. 11 illustrates a disclosed display on a hand-held device such as a PDA, smart phone or tablet PC.

Turning to FIG. 11, a sample display 110*b* is shown that could be used with a PDA, tablet PC or smart phone type of device. The graphics display editor illustrated above in connection with FIGS. 1-10 can be used on these types of handheld devices.

Figure 12:
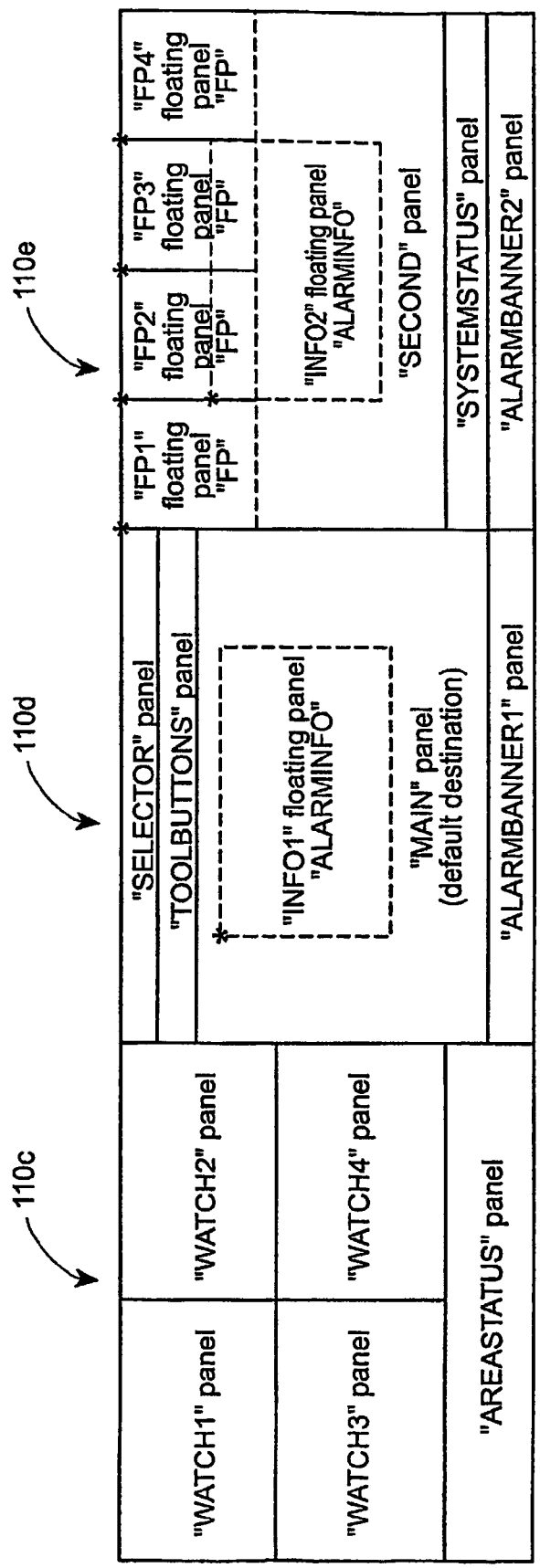
FIGS. 12 and 13 illustrate the applicability of the disclosed graphics display editor to multi-panel or multi-screen workstations.
Figure 13:
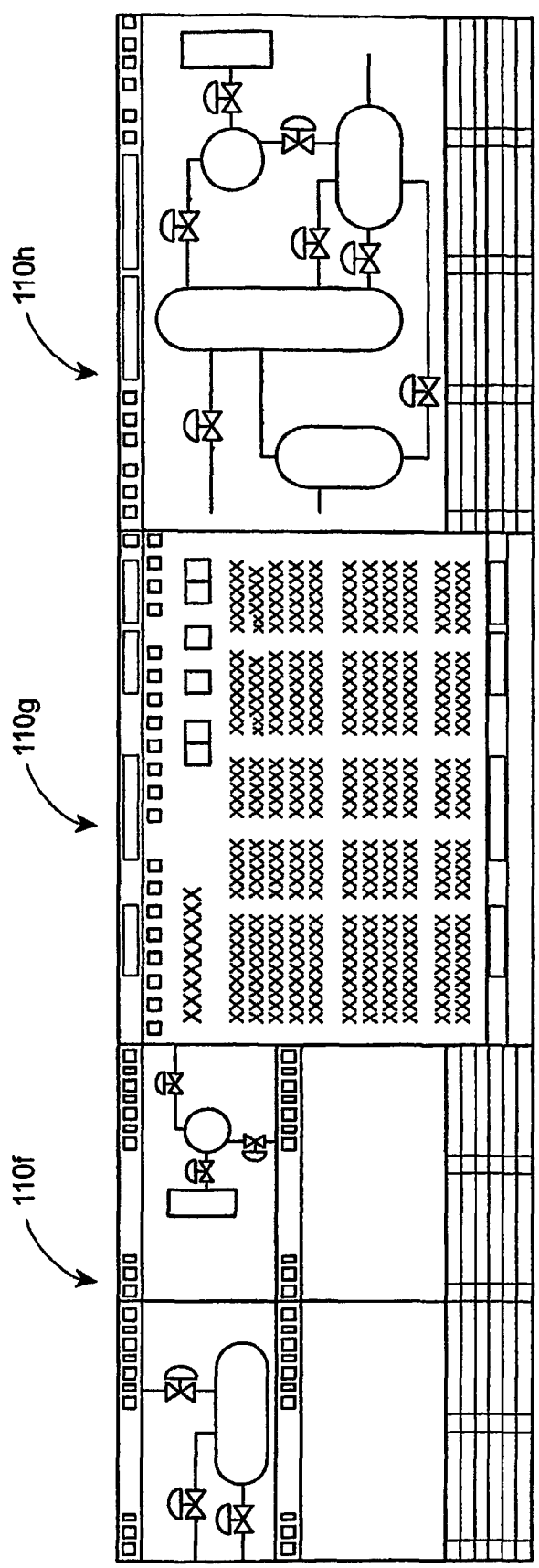

Further, as noted above, the above-described display editor can be utilized in multi-screen workstations such as those illustrated in FIGS. 12 and 13. The display shown at 110*c*-110*h* can all be configured for operations or process control, maintenance, configuration, simulation or supervisory personnel. Various displays 110*c*-110*h* can individually be process control, maintenance, simulation, configuration or supervisory displays or each individual display panel 110*c*-110*h* can be combinations of any of the various functions that are supportable by the graphics display editor. Thus, the disclosed system provides multiple functional displays on a single display system for a type workstation or a hand-held device as well as multiple display workstations.

While only certain embodiments have been set forth, alternative embodiments in various modifications will be apparent from the above description to those skilled in the art. These and other alternatives are considered equivalents and within the spirit and scope of this disclosure.

What is claimed is:

1. An integrated graphical user interface for a process control environment, the integrated graphical user interface comprising:
    a configuration environment;
    a plurality of graphical element objects included in the configuration environment, each graphical element object corresponding to a data source in the process control environment and including:
        a visualization defining a visual property of a graphical element corresponding to the each graphical element object when the each graphical element object is implemented in a run-time environment, and
        at least one element binding defining an element interface between the each graphical element object and the data source in the run-time environment;
    a plurality of graphical display objects included in the configuration environment, each graphical display object corresponding to a display view presented in the run-time environment and including:
        an indication of one or more connecting graphical element objects, and
        one or more display bindings defining a display interface between the each graphical display object and the display view in the run-time environment;
    a resolution table including:
        an indication of connections between element bindings and data sources in the process control environment, and
        an indication of connections between display bindings and display views in the process control environment;
    the runtime environment including a real-time interface to two or more functional areas of a process plant, the functional areas including operations, maintenance, configuration, and simulation;
    two or more real-time displays provided by the real-time interface,
        each of the two or more real-time displays corresponding to a different functional area of the process plant,
        each of the two or more real-time displays being bound, using the resolution table and a respective display binding, to a respective graphical display object, and
        each respective graphical display object corresponding to the each of the two or more real-time displays including an indication of a same graphical element object from the plurality of graphical element objects; and
    a same graphical element corresponding to the same graphical element object, the same graphical element presented on each of the two or more real-time displays and bound, using the resolution table and a respective element binding, to a same data source in the run-time environment.

2. The integrated graphical user interface of claim 1, wherein the two or more real-time displays include a display of at least one of: a panel motor start/stop button, a status indication, a chart recorder, an annunciator panel, a subsystem interface, a maintenance request, a maintenance report, or a supervisory report.

3. The integrated graphical user interface of claim 1, wherein the integrated graphical user interface supports an operator interface for performing one or more of: alarm management, process parameter adjustment by entry of process parameters, zoom in viewing of portions of the process for enhanced detail viewing, or utilization of specialized applications related to the process.

4. The integrated graphical user interface of claim 1, wherein the integrated graphical user interface can run in a dedicated mode and a non-dedicated mode, the dedicated mode comprising at least one of: a mode including a fixed display arrangement or a mode corresponding to controlled access, and the non-dedicated mode for use by configuration personnel.

5. The integrated graphical user interface of claim 1, wherein the same graphical element object is executable on one or more of a workstation, a laptop, a PDA (Personal Data Assistant), a display on multiple monitors, or a smart phone.

6. The integrated graphical user interface of claim 1, wherein the integrated graphical user interface supports multiple user interface devices including at least one of a rich client, a web browser, a handheld, or a smart phone.

7. The integrated graphical user interface of claim 1, wherein the integrated graphical user interface supports one or more of: integrated voice and video; real-time data services; external data services; XML files; access to other service interfaces; composite structure process graphics; class-based control hierarchies; integration of control, alarming, and abnormal situation management and prevention; integrated batch operator interfaces; integrated advanced control operator interfaces; route management; efficiency calculations; optimizations; mass and energy balances; integration of third party applications; multiple data collection systems (DCS), or combinations thereof.

8. The integrated graphical user interface of claim 1, wherein the runtime environment further includes an instantiation process that binds, during runtime, the same graphical element object to the same data source in the process control environment.

9. The integrated graphical user interface of claim 1, wherein the same graphical element object includes at least one of a parameter, a property, an action, or an animation.

10. The integrated graphical user interface of claim 1, wherein the each graphical display object further includes at least one of: a connector, an animation, an action, or a property.

11. The integrated graphical user interface of claim 1, wherein the configuration environment further includes a graphical display editor for creating the plurality of graphical element objects and a graphic object database for storing the plurality of graphical element objects.

12. The integrated graphical user interface of claim 1, wherein the same graphical element object is included in at least one of: predictive control, predictive maintenance, or system level error detection in the process plant.

13. An integrated graphical interface providing integrated graphical displays for operation, maintenance, configuration, and simulation of a control system, the interface comprising:
a real-time user interface providing two or more real-time displays, each of the two or more real-time displays corresponding to a different functional level of a set of functional levels of the control system, the set of functional levels including an operations functional level, a maintenance functional level, a configuration functional level, and a simulation functional level;
two or more graphic display objects:
each corresponding to a respective one of the two or more real-time displays,
each bound, via a respective display binding and a resolution table, to the respective one of the two of more real-time displays, and
each including an indication of a same graphic element object and including the respective display binding defining a display interface between the each of the two or more graphic display objects and the respective one of the two or more real-time displays in a run-time environment;
a graphic element corresponding to the same graphic element object and included on each of the two or more real-time displays, the graphic element bound, via a respective element binding and the resolution table, to a data source in the process plant;
the same graphic element object including:
the respective element binding defining an element interface between the same graphic element object and the data source in the run-time environment;
a visualization defining a visual property of the graphic element when the same graphic element object is implemented in the run-time environment; and
at least one of an element parameter, an element property, an element action, or an element animation; and
the resolution table including indications of a plurality of connections between element bindings and data sources, and indications of a plurality of connections between display bindings and real-time displays.

14. The integrated graphical interface of claim 13, wherein at least one of the two or more graphic display objects further includes indications of at least two graphic element objects, a connector, and at least one of a display property, a display action, or a display animation.

15. The integrated graphical interface of claim 13, further comprising a graphic display editor for creating a new graphic element object, a graphic database for storing a set of graphic element objects that includes the new graphic element object and the same graphic element object, and an instantiation process that binds the same graphic element object to the data source via the element binding.

16. The integrated graphical interface of claim 13, wherein the real-time user interface is provided on at least one of: a workstation, a laptop, a PDA (Personal Data Assistant), a display across multiple monitors, a multi-screen workstation, a rich client, a web browser, a handheld, or a smart phone.

17. A method, comprising:
providing an integrated graphical user interface for two or more functional areas of a process plant, the functional areas including operations, maintenance, configuration, and simulation;
providing two or more real-time displays in the integrated graphical user interface, each of the two or more real-time displays corresponding to a different functional area;
providing a set of graphical display objects including respective graphical display objects corresponding to the two or more real-time displays, each graphical display object of the set of graphical display objects corresponding to a respective real-time display and including:
an indication of one or more connecting graphical element objects, and
one or more display bindings defining a display interface between the each graphical display object and the respective real-time display in a run-time environment;
providing a set of graphical element objects including the one or more connecting graphical element objects, each graphical element object of the set of graphical element objects corresponding to a respective data source in the process plant and including:
a visualization defining a visual property of a graphical element corresponding to the each graphical element object when the each graphical element object is implemented in the run-time environment, and
at least one element binding defining an element interface between the each graphical element object and the respective data source in the run-time environment; providing a resolution table including:
indications of connections between element bindings and data sources in the process plant, and
indications of connections between display bindings and real-time displays in the process plant;
binding, using respective display bindings and the resolution table, the two or more real-time displays to respective graphical display objects;
binding, using a respective element binding and the resolution table, a particular graphical element object to a particular data source; and
including, on each of the two or more real-time displays, a particular graphical element corresponding to the particular data source.

* * * * *

UNITED STATES PATENT AND TRADEMARK OFFICE
CERTIFICATE OF CORRECTION

| | | |
|---|---|---|
| PATENT NO. | : 7,971,151 B2 | Page 1 of 1 |
| APPLICATION NO. | : 10/575173 | |
| DATED | : June 28, 2011 | |
| INVENTOR(S) | : Mark J. Nixon et al. | |

It is certified that error appears in the above-identified patent and that said Letters Patent is hereby corrected as shown below:

At Column 1, line 10, ".Interface" should be -- Interface --.

Signed and Sealed this
Eleventh Day of September, 2012

David J. Kappos
*Director of the United States Patent and Trademark Office*